United States Patent [19]
Jeter, Jr.

[11] 3,886,788
[45] June 3, 1975

[54] TRACTOR TEST CELL
[75] Inventor: Harold W. Jeter, Jr., Peoria, Ill.
[73] Assignee: Caterpillar Tractor Co., Peoria, Ill.
[22] Filed: Sept. 4, 1973
[21] Appl. No.: 394,167

[52] U.S. Cl. ............................................... 73/117
[51] Int. Cl. ............................................. G01l 5/13
[58] Field of Search .......... 73/117, 126, 123; 74/14

[56] References Cited
UNITED STATES PATENTS

| | | | |
|---|---|---|---|
| 1,064,615 | 6/1913 | Cooke | 73/117 |
| 1,924,833 | 8/1933 | Brown | 73/126 |
| 2,696,104 | 12/1954 | Markey et al | 73/117 X |
| 2,993,369 | 7/1961 | Bonomo et al. | 73/134 |
| 3,520,180 | 7/1970 | Polhemus et al | 73/117 UX |
| 3,750,464 | 8/1973 | Ostrander | 73/117 |

*Primary Examiner*—Jerry W. Myracle
*Attorney, Agent, or Firm*—Phillips, Moore, Weissenberger, Lempio & Strabala

[57] ABSTRACT

A test facility for large vehicles, such as crawler tractors and wheeled construction equipment, includes a treadmill for supporting, driving, and braking the vehicle, a dynamometer coupled to the vehicle power takeoff shaft, a pair of load arms having load cells provided therein and attached to trunnions on the vehicle undercarriage, a function control unit to remotely operate the vehicle, and a computer coupled to the vehicle instrumentation, the treadmill, the dynamometer, the load cells, and the function control unit to automatically control the unit through predetermined test cycles, to monitor vehicle operation and response, and to provide a printed record of such operation and response.

9 Claims, 9 Drawing Figures

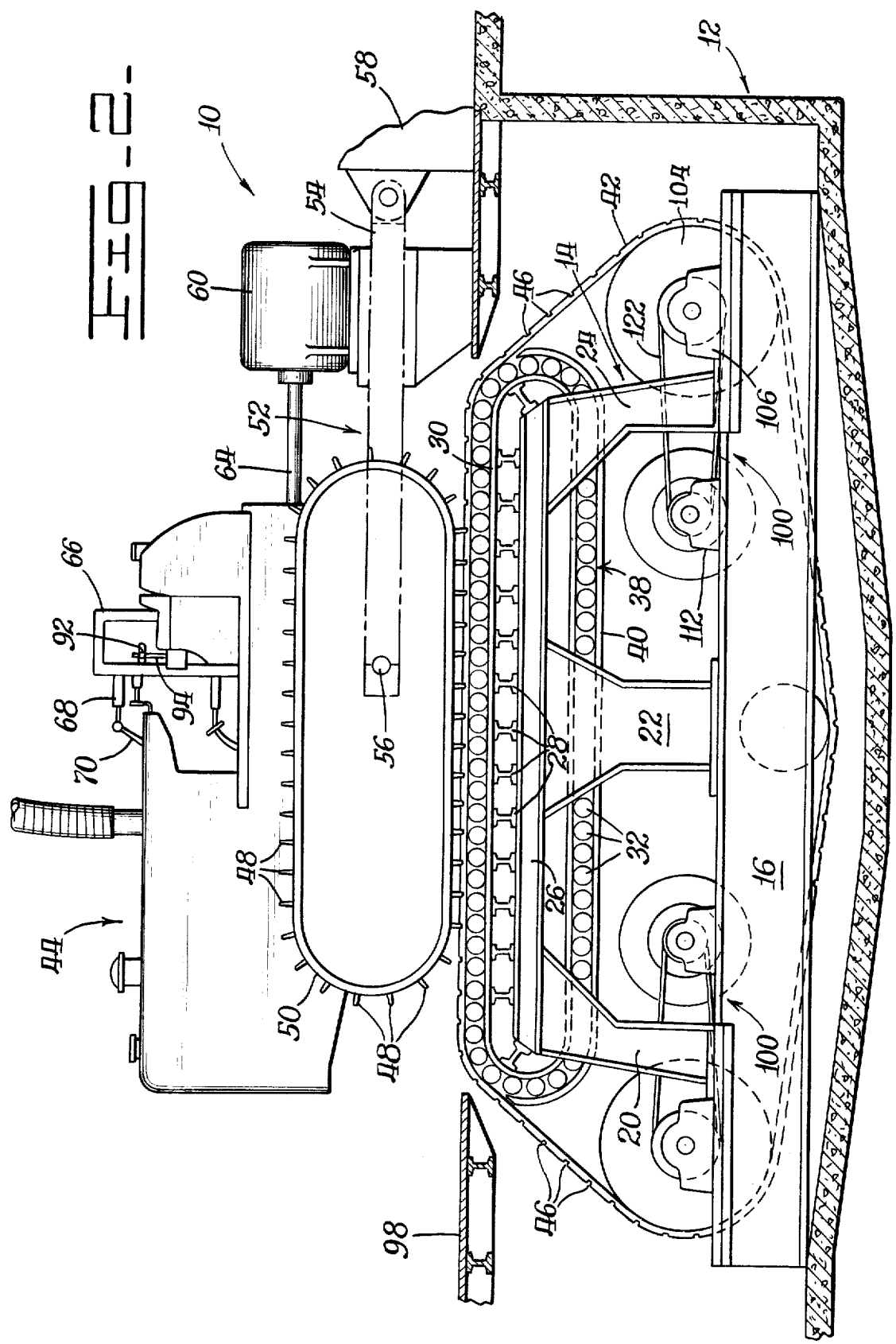

PATENTED JUN 3 1975
3,886,788
SHEET 3
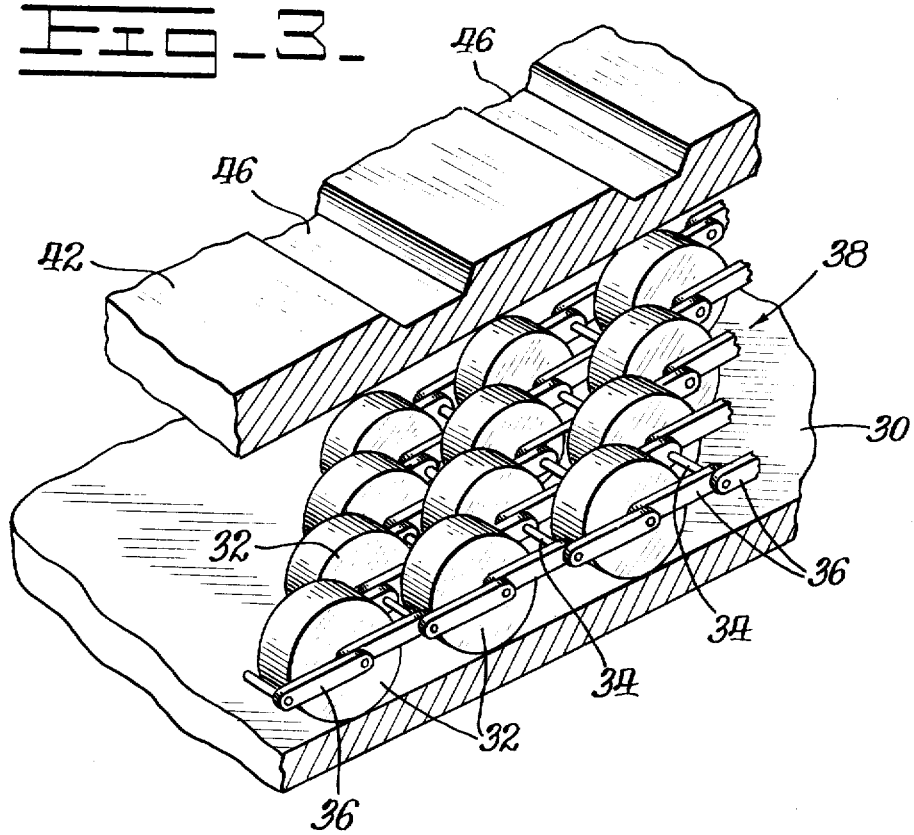
Fig_3_
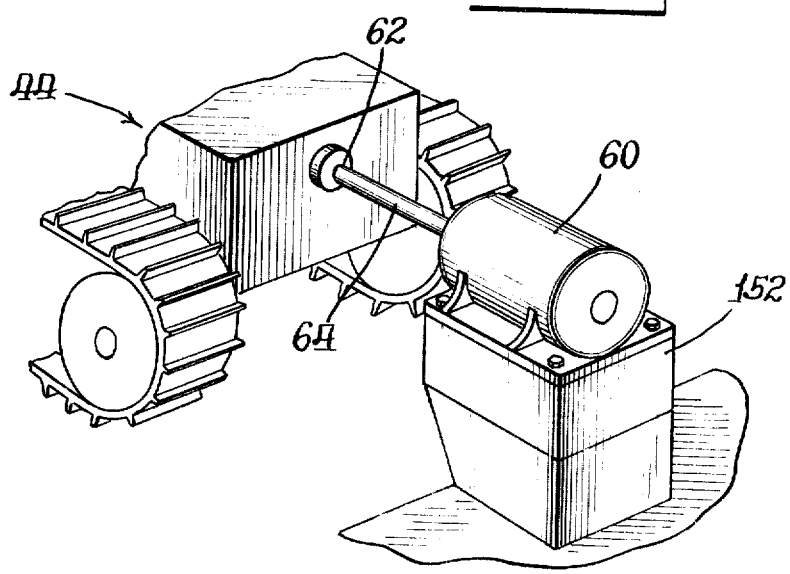
Fig_9_

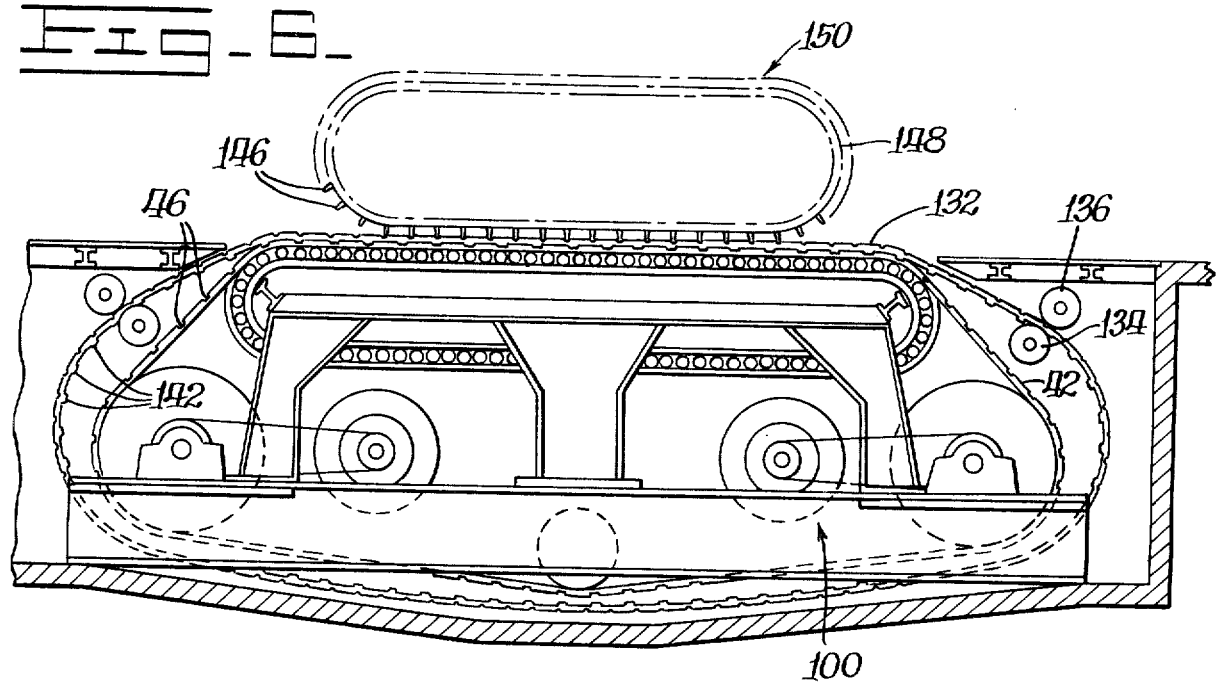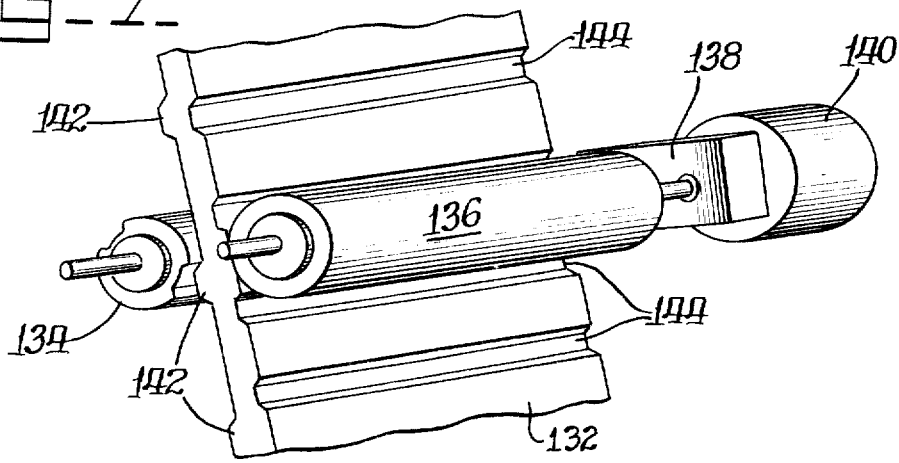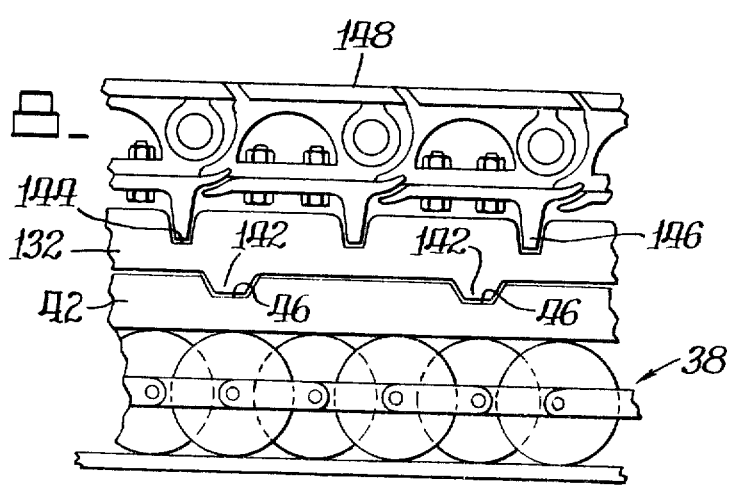

3,886,788

TRACTOR TEST CELL

BACKGROUND OF THE INVENTION

This invention relates to test cells for vehicles, and more particularly, to a test cell which is particularly adapted for the testing of a variety of large vehicles.

Testing of large vehicles, such as crawler tractors and large rubber-tired construction machines, has been heretofore limited to driving such a vehicle around a short prescribed course, or tethering the vehicle to a restraint while supporting the vehicle on a low friction surface, such as an oiled plate. Tests of this nature must often rely on the judgment of an operator, and such subjective criteria as listening for strange noises, observing unusual or erratic operation of the vehicle, and monitoring the control response and instruments mounted on the vehicle.

More recently, attempts have been made to obtain objective test data by using sophisticated electronic test equipment to monitor preselected vehicle operating parameters. However, such attempts have been only partially satisfactory since an operator still controls the vehicle, and his subjective judgment is required to compensate for the variable operating conditions.

The advantages gained by controlling the vehicle test environment have been well recognized in automotive testing. Motoring dynamometers incorporated in automotive vehicle test stands are well known in the art. Such an arrangement is described in U.S. Pat. No. 3,286,517 to Ostrander. A similar arrangement, applicable to larger vehicles such as military tanks in particular, is described in U.S, Pat, No. 3,345,865 to Ostrander. However, such testing devices are generally designed for a specific vehicle, and are restricted in accommodating both wheeled and track vehicles. Also, a study of these references reveals that data obtained from a vehicle supported on such a device may be influenced by the action and response of individual vehicle operators.

SUMMARY OF THE INVENTION

It is an object of this invention to provide a vehicle testing device capable of accommodating large wheeled or tracked vehicles.

It is a further object of this invention to provide a vehicle testing device which, while fulfilling the above object, is capable of measuring a variety of test parameters without introducing operator-induced errors into the test results.

It is a still further object of this invention to provide a vehicle testing device which, while fulfilling the above objects, is extremely efficient in design and operation.

Broadly stated, the invention comprises a testing device for a vehicle including a ground-engaging drive mechanism. Such device comprises a frame, an endless belt on which the ground-engaging drive mechanism of the vehicle is disposed, means associated with the frame and belt for supporting the belt and vehicle thereon relative to the frame, and allowing the belt to travel along its length relative to the frame, and means for limiting movement of the vehicle relative to the frame.

BRIEF DESCRIPTION OF THE DRAWINGS

These and other objects of the invention will become apparent from a study of the following specification and drawings, in which:

FIG. 2 is a side elevation, partially in section, of the test cell and vehicle as shown in FIG. 1;

FIG. 3 is a perspective view, partially in section, and with portions removed, of the belt roller means of the test cell;

FIG. 6 is a side elevation, partially in section, of the test cell, showing the use of a second belt therewith;

FIG. 7 is a perspective view of the apparatus of the test cell for feeding in the second belt thereof;

FIG. 8 is a side elevation of a portion of the test cell, showing in detail the use of the second belt of the apparatus; and FIG. 9 is a perspective view of the dynamometer of the test cell showing the use thereof.

DESCRIPTION OF THE PREFERRED EMBODIMENT

Figure 1:
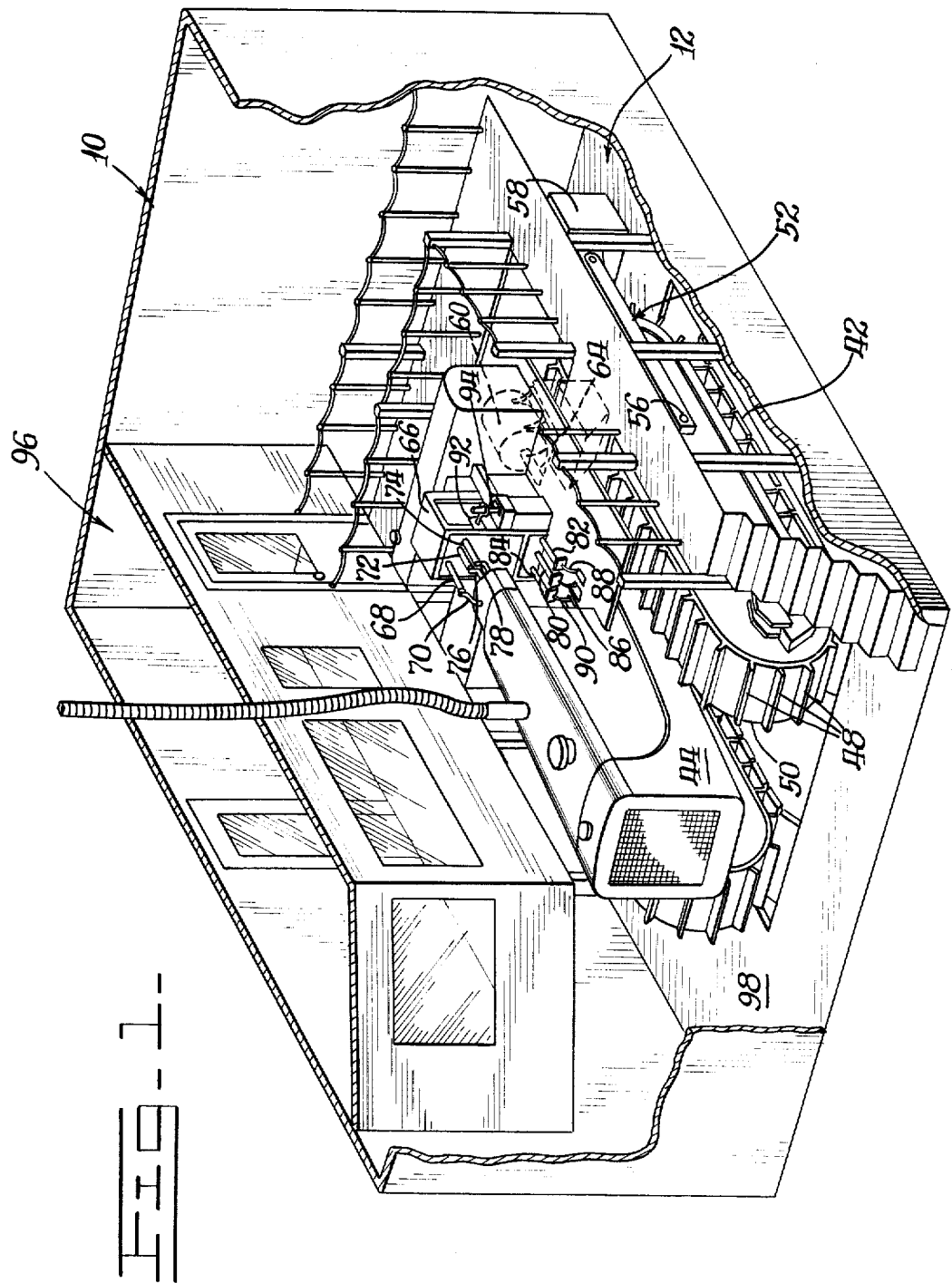
FIG. 1 is a perspective view, partially broken away, of the vehicle test cell, showing a track-type tractor therewith.

With reference to FIG. 1 of the drawins, a tractor testing device or cell embodying the principles of the present invention is shown generally by the reference numeral 10. The device 10 rests on and is fixed relative to a foundation slab 12 and includes a frame 14. The frame 14 includes a pair of horizontally disposed beams 16,18. Vertical structure members 20,22,24 are mounted to beam 16, and support an upper horizontally disposed beam 26. Although not specifically shown, similar vertical structural members are mounted on the beam 18 and likewise support a second upper horizontally disposed beam. A plurality of transverse beams 28 are mounted on the upper beams, serving as joists to support a load plate 30.

As best shown in FIG. 3, a plurality of steel rollers 32 are rotatably connected by a plurality of pins 34, and pivotably connected links 36 to form a continuous endless roller belt or mat as generally indicated by the reference numeral 38. A lower roller mat support plate 40 is provided to guide and support the recirculating roller mat 38.

A continuous or endless belt 42, supported by the roller mat 38, is disposed thereabout. A vehicle, such as a track-type tractor 44, is positionable on the belt 42, and supported thereon relative to the frame 14. The belt 42 defines a plurality of recessed areas or grooves 46, sized and spaced so that projecting ground-engaging members 48 defined by the tractor track 50 seat therein, as shown.

A draw bar load arm 52, having a load cell 54 capable of measuring tensile and compressive forces and integrally mounted therewith, is attached along each side of the tractor 44 to a trunnion 56 positioned on the vehicle undercarriage. In the vehicle 44 shown, the trunnion 56 is provided as an attachment point for bulldozer blades and the like. Other earthmoving and construction vehicles generally provide such mounting points on the vehicle undercarriage for attaching similar auxiliary equipment. The opposite end of the draw bar load arm 52 is attached to anchor 58, fixed relative to frame 14. Such draw bar load arm 52 limits movement of the vehicle 44 relative to the frame 14.

A dynamometer 60, shown in hidden lines in FIG. 1, is attached to the power takeoff coupling 62 commonly provided on such vehicles to operate auxiliary equipment and attachments by a shaft 64, also represented by hidden lines.

A vehicle function control unit 66 is positioned on the tractor 44 at the operator's station as shown. A plurality of appendages extend from the vehicle control unit 66 to engage the vehicle control elements. A throttle lever control arm 68 engages the vehicle throttle lever 70 as shown. A right steering clutch control arm 72 and a left steering clutch control arm 74 also engage the vehicle right steering clutch lever 76 and left steering clutch lever 78 respectively. A right brake control arm 80, a left brake control arm 82, and a decelerator control arm 84 are positioned to react against the vehicle right brake pedal 86, left brake pedal 88 and decelerator pedal 90 respectively. A transmission range selector control arm 92 extends from the side of the function control unit 66 to engage a vehicle transmission range selector lever 94. Each of the foregoing lever and pedal control arms may be actuated by electronically controlled hydraulic positioners.

An enclosed platform 96 provides an observation station for a test operator and a controlled environment enclosure for data acquisition, computing, printing, monitoring and controlled equipment.

The foundation slab 12 is positioned elevationally lower than the test floor 98 of the device 10, with a vertical wall extending between the foundation slab 12 and the test floor 98, thereby forming an inspection chamber providing access for service and inspection of the support structures and vehicle undercarriage.

Figure 4:
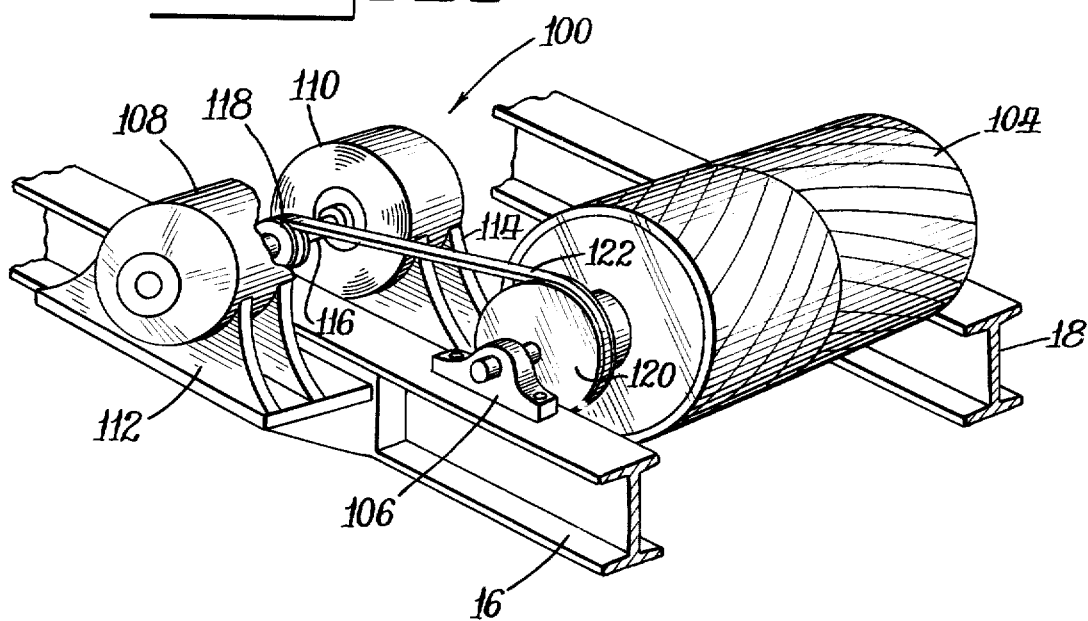
FIG. 4 is a perspective view, with portions removed, of the belt power unit.

A treadmill power unit, as generally indicated by the reference numerals 100, is mounted on each end of each of the beams 16,18. Each of such power units, as shown in FIG. 4, includes an end drum 104 rotatably mounted by pillow blocks 106 to the horizontally disposed beams 16,18 and a pair of hydraulic motors 108,110, each fixably secured to the beam 16 by cradle support structures 112,114 respectively. The motors 108,110 respectively have output shafts 116 coupled together by a drive sprocket 118. The drum 104 is also coupled to a sprocket 120, which is coupled by a chain 122 to the drive sprocket 118. The belt 42 is disposed around the drums, and the inner suface of belt 42 contacts the surfaces of the drums, which are grooved or otherwise textured to provide a slip-resistant drive therebetween.

Figure 5:
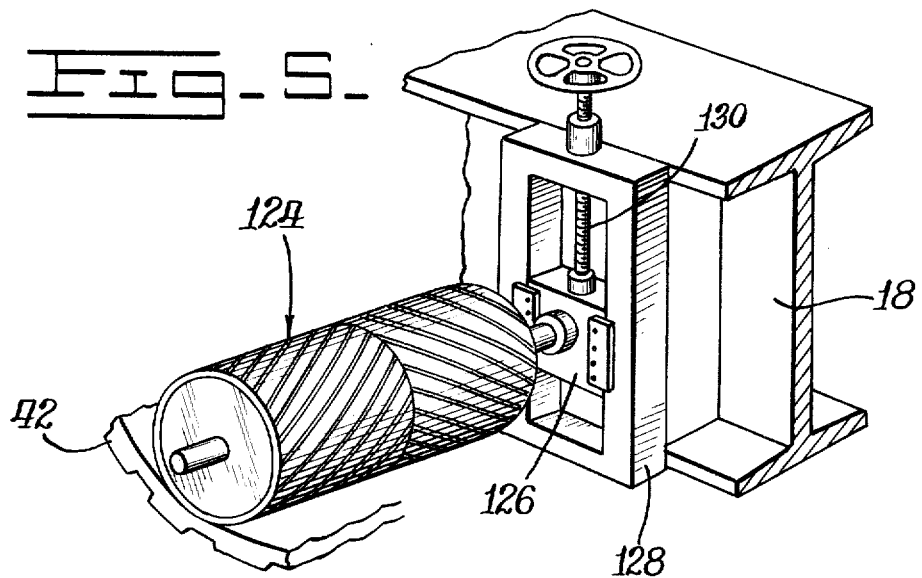
FIG. 5 is a perspective view of the belt tensioning means of the test cell.

Tension in the belt 42 is provided by a vertically adjustable belt tension roller 124. With reference to FIG. 5, each end of the roller 124 is rotatably mounted in a bearing block 126. For the sake of clarity, the adjustable mounting arrangement for only one end of the belt tension roller 124 is shown. The bearing block 126 is laterally restrained by a guide frame 128 fixably secured to the beam 18, and vertically positioned by an adjusting screw 130.

To adapt the arrangement to vehicles other than those provided for by the belt 42, and overlay belt 132 is assembled about and generally along the master belt 42 as shown in FIG. 6. The overlay belt 132 is provided with a splice joint to facilitate installation and removal. As shown more clearly in FIG. 7, a pair of rollers 134,136, driven through a gear reduction 138 by a reversible electric motor 140, are mounted on each end of the device 10. One end of the overlay belt 132 is inserted between the rollers 134,136 and then fed toward the other belt end by the motor-driven rollers 134,136. The roller 134 is notched to engage overlay belt inwardly projecting member 142 provided on the inner surface of the overlay belt 132. As shown in FIG. 8 when the overlay belt 132 is in place, with the ends spliced together to form a continuous, endless belt, the members 142 of the overlay belt 132 engage the grooves 46 of the belt 42.

The overlay belt 132 has a plurality of recessed areas or grooves 144 formed on the outer surface, sized and spaced to mate with the projecting members 146 of the track 148 of an alternate vehicle 150. In similar fashion, an overlay belt having grooves mating with the tread pattern of a rubber-tired vehicle could alternately be provided to permit testing of large wheeled vehicles.

The mounting arrangement of the dynamometer 60 is shown in FIG. 9. The dynamometer 60 is mounted on a pedestal 152 and joined by the shaft 64 to power takeoff coupling 62 provided on the vehicle.

OPERATION

It will be understood that, if so chosen, the belt 42 on which the vehicle 44 is disposed is drivable by the vehicle to travel along its length relative to the frame 14. The hydraulic motors 108,110 may then selectively be used to resist the travel of the belt 42 relative to the frame 14, and the power absorbed during this operation may be measured, so that vehicle output horsepower can be determined. Vehicle output horsepower could also be determined by measuring the substantially horizontal load exerted on the arm 52, through such means as described above. As an alternative, the hydraulic motors 108,110 could be used to selectively drive the belt 42 independently of the vehicle engine, so that appropriate measures of chosen parameters may be taken under this condition also.

The vehicle engine performance may be easily determined by measuring fuel rate and RPM and computing engine horespower with an engine performance computer, such as described in co-pending application Ser. No. 135,300 (assigned to the assignee of this application). The net difference between calculated engine horsepower and measured vehicle output horsepower will be attributable to transmission, final drive, and track system losses. The net horsepower loss for a particular vehicles should fall within certain predetermined limits. If the horsepower loss for a test vehicle is higher than the predetermined limit, the dynamometer 60 may be installed as shown in FIG. 9, and the horsepower measured at the power takeoff coupling 62. This measurement will exclude the final drive and track system, thereby making possible a determination of which vehicle component is responsible for the abnormal losses determined in the overall vehicle test.

It can be readily appreciated that the test data from an appropriate test cycle will permit detection of faulty vehicle components and enable a manufacturer to make repairs at the point of manufacture, thereby reducing costly warranty claims. Thus, improved quality and performance of the vehicle is provided.

What is claimed is:

1. A testing device for a vehicle having a ground-engaging drive mechanism comprising: a frame; an endless belt on which the ground-engaging drive mechanism of the vehicle may be disposed; means associated with the frame and belt for supporting the belt and the vehicle disposed thereon relative to the frame, and allowing the belt to travel along its length relative to the frame; and means for limiting movement of the so-disposed vehicle relative to the frame, and comprising the ground-engaging drive mechanism defining a plurality of projecting ground-engaging members, and wherein the belt defines a plurality of recessed areas sized and spaced so that the projecting members of the drive mechanism seat therein.

2. A testing device for a vehicle having a ground-engaging drive mechanism comprising: a frame; an endless belt on which the ground-engaging drive mechanism of the vehicle may be disposed; means associated with the frame and belt for supporting the belt and the vehicle disposed thereon relative to the frame, and allowing the belt to travel along its length relative to the frame; and means for limiting movement of the so-disposed vehicle relative to the frame, and further comprising a second belt disposed about and generally along said first-mentioned belt, and defining a plurality of inwardly projecting members, and wherein the first-mentioned belt defines a plurality of recessed areas sized and spaced so that the inwardly projecting members of the second belt seat therein, the ground-engaging drive mechanism defining a plurality of projecting ground-engaging members, the second belt defining a plurality of recessed areas sized and spaced so that the projecting members of the drive mechanism seat therein.

3. A testing device for a vehicle having a ground-engaging drive mechanism comprising: a frame; an endless belt on which the ground-engaging drive mechanism of the vehicle may be disposed; means associated with the frame and belt for supporting the belt and the vehicle disposed thereon relative to the frame, and allowing the belt to travel along its length relative to the frame; and means for limiting movement of the so-disposed vehicle relative to the frame, wherein the belt is drivable by the so-disposed vehicle to so travel along its length, and further comprising means for selectively resisting said travel of the belt relative to the frame, and further comprising means independent of said so-disposed vehicle for selectively driving said belt, wherein the means for selectively resisting travel of the belt and the means for selectively driving said belt independent of the so-disposed vehicle comprise hydraulic motor means, and drum means connected to the hydraulic motor means and having the belt disposed thereabout and and in contact therewith, wherein the means for limiting movement of the so-disposed vehicle relative to the frame comprise means for interconnecting the so-disposed vehicle and frame for measuring substantially horizontal load between the vehicle and frame, and wherein the means associated with the frame and belt for supporting the belt and the vehicle disposed thereon relative to the frame comprise roller means rollable on a portion of the frame, and on which the belt is disposed.

4. The testing device of claim 3 and adjustable means interconnecting the frame and belt to selectively tension the belt.

5. The testing device of claim 4 wherein the ground-engaging drive mechanism comprises a plurality of projecting ground-engaging members, and wherein the belt defines a plurality of recessed areas sized and spaced so that the projecting members of the drive mechanism seat therein.

6. The testing device of claim 4 and further comprising a second belt disposed about and generally along said first-mentioned belt, and defining a plurality of inwardly projecting members, and wherein the first-mentioned belt defines a plurality of recessed areas sized and spaced so that the inwardly projecting members of the second belt seat therein, the ground-engaging drive mechanism defining a plurality of projecting ground-engaging members, the second belt defining a plurality of recessed areas sized and spaced so that the projecting members of the drive mechanism seat therein.

7. The testing device of claim 6 and further comprising dynamometer means connectable to the so disposed vehicle.

8. A testing device for a vehicle having a ground-engaging drive mechanism comprising; a frame; and endless belt on which the ground-engaging drive mechanism of the vehicle may be disposed; means associated with the frame and belt for supporting the belt and the vehicle disposed thereon relative to the frame, and allowing the belt to travel along its length relative to the frame, and allowing the belt to travel along its length relative to the frame; and means for limiting movement of the so-disposed vehicle relative to the frame, wherein the means associated with the frame and belt for supporting the belt and the vehicle disposed thereon relative to the frame comprise roller means rollable on a portion of the frame, and on which the belt is disposed.

9. The testing device of claim 8 wherein the roller means comprise an endless roller belt comprising a plurality of rollers, and a plurality of link members pivotally interconnecting the rollers.

* * * * *